Patented June 15, 1943

2,321,767

UNITED STATES PATENT OFFICE 2,321,767

MANUFACTURE OF AMINOANTHRA-
QUINONE COMPOUNDS

James Ogilvie, Buffalo, N. Y., assignor to Allied
Chemical & Dye Corporation, a corporation of
New York No Drawing. Application June 26, 1940,
Serial No. 342,439

10 Claims. (Cl. 260—378)

This invention relates to the manufacture of amino-anthraquinones by desulfonation of aminoanthraquinone sulfonic acids. It relates more particularly to a novel desulfonation process for the manufacture of diaminoanthraquinones wherein one of the benzene nuclei of the anthraquinone molecule contains two substituted or unsubstituted amino groups in para-position to each other and at least one unsubstituted ortho-position.

Diamino-anthraquinones of the said type, which for simplicity will be referred to hereinafter and in the claims as "1,4-diamino-anthraquinones," are represented by the following general formula:

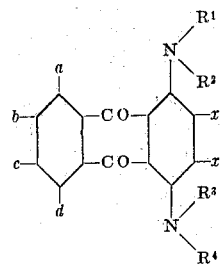

in which $R^1$, $R^2$, $R^3$, and $R^4$ are each hydrogen or an alkyl, aralkyl, aryl, or hydroaromatic radical (including cycloalkyl) and may be the same or different; one $x$ is hydrogen, and the other $x$ is hydrogen or a substituent, such as halogen, alkyl, alkoxy, aryloxy, a free or neutralized sulfo group; and $a$, $b$, $c$ and $d$ are each hydrogen or a substituent (such as, one of those mentioned above or below) and may be the same or different. When $R^1$, $R^2$, $R^3$ or $R^4$ is a radical, it may contain one or more substituents, such as —OH, —OR',

($R^1$ and $R^2$ having the above meaning), and —SO₃H (in the free acid or salt form).

Representatives of such 1,4-diamino-anthraquinones are: 1,4-diamino-anthraquinone, 1-amino-4-methylamino-anthraquinone, 1-amino-4-butylamino-anthraquinone, 1-amino-4-benzylamino-anthraquinone, 1-amino-4-(4'-amino-phenylamino)-anthraquinone, 1-amino-4-(4'-dimethylamino-phenylamino)-anthraquinone, 1-amino-4-(4'-methoxy-phenylamino)-anthraquinone, and the compounds of U. S. P. 2,050,704 and U. S. P. 2,053,278.

According to the present invention, a para-diamino-anthraquinone containing at least one sulfo group (a sulfonic acid group in the free acid or salt form) in ortho-position to said amino groups (that is, a 1,4-diamino-anthraquinone of the type referred to above which contains a sulfo group in the 2- and/or 3-position, and which for simplicity will be referred to hereinafter and in the claims as a "para-diamino-ortho-sulfo-anthraquinone") is desulfonated, that is, the sulfo group in the 2- or 3-position is replaced by hydrogen, to form the corresponding 1,4-diamino-anthraquinone, by reacting the said para-diamino-ortho-sulfo-anthraquinone with a furane aldehyde in an aqueous alkaline reaction medium.

In the practice of the present invention in accordance with a preferred method of procedure, the para-diamino-ortho-sulfo-anthraquinone is mixed with sufficient water to provide a thinly fluid mixture, furfural (furfuraldehyde) is added in excess of an equimolecular proportion based on the weight of the para-diamino-ortho-sulfo-anthraquinone, and the mixture is heated with alkali. For example, 1 part by weight of the para-diamino-ortho-sulfo-anthraquinone, preferably in the form of an alkali metal salt, is mixed with about 25 to about 50 parts by weight of water; sufficient furfural is added to form an aqueous solution containing from about 4 per cent to about 8 per cent of furfural by weight (which corresponds with from about 4.5 mols to about 18 mols of furfural per mol of the para-diamino-ortho-sulfo-anthraquinone); the resulting mixture is heated nearly to its boiling point (for instance, 85° C. to 100° C.) and, while being agitated, it has added to it alkali, preferably in the form of a concentrated aqueous solution of alkali metal hydroxide. After all of the alkali has been added, the temperature is maintained within substantially the range mentioned above, and agitation is continued until the reaction is substantially complete. The desulfonation proceeds smoothly with formation of the 1,4-diamino-anthraquinone which, if insoluble in water, gradually precipitates during the course of the reaction. The reaction usually requires from about 1 to about 5 hours. The 1,4-diamino-anthraquinone thus produced is then recovered from the remaining reaction mixture. If it is a water-insoluble compound it may be recovered directly as the filter cake by filtration, and washed with hot water to remove residual alkali. If it is a water-soluble compound, e. g., sodium 1,4-diamino-anthraquinone monosulfonate, obtained by desulfonating a corresponding disulfonic acid, it may be recovered by adding common salt to the reaction mixture in sufficient amount to salt out the monosulfonate only (leaving in solution any disulfonate, which requires much more salt for precipitation), separating the monosulfonate as the filter cake by filtration, and washing the cake to remove residual alkali.

Theoretically, for the replacement of one sulfo group by hydrogen in one mol of para-diamino-ortho-sulfo-anthraquinone, two mols of alkali metal hydroxide and one mol of furfuraldehyde are required in accordance with the equation:

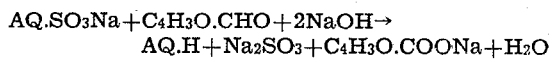

AQ.SO₃Na+C₄H₃O.CHO+2NaOH→
AQ.H+Na₂SO₃+C₄H₃O.COONa+H₂O wherein AQ represents the para-diamino-anthraquinone residue of the para-diamino-ortho-sulfo-anthraquinone. In practice, it has been found that it is preferable to employ from about 4.5 mols to about 18 mols of furfural per mol of para-diamino-ortho-sulfo-anthraquinone and to add gradually a total amount of alkali which corresponds with about 1.5 to about 5 mols per mol of furfural.

The invention has a number of advantages. Thus, the process is simple to carry out, smooth in operation, capable of control, and results in good yields, at relatively low cost, of 1,4-diamino-anthraquinones many of which are useful as intermediate compounds and some of which are valuable as coloring agents and dyestuffs for dyeing cellulose esters and ethers. Further, the invention provides a process for removing successively sulfo groups from positions adjacent to an amino group of a para-diamino-anthraquinone.

The invention is of particular importance in connection with the manufacture of water-insoluble 1,4-diamino-anthraquinones which are unsubstituted in the 5-, 6-, 7- and 8-positions from corresponding para-diamino-ortho-sulfo-anthraquinones which can be obtained by relatively inexpensive methods. It is especially of value for the manufacture of 1-amino-4-arylamino-anthraquinones (for example, 1-amino-4-phenylamino-anthraquinone and derivatives thereof, such as those mentioned above, in which the phenylamino radical is further substituted in the 4'-position by a free or substituted amino-group or an alkoxy-group) and 1-amino-4-alkylamino-(or 4-aralkylamino)-anthraquinones (for example, 1-amino-4 - methylamino - anthraquinone, 1-amino-4-butylamino-anthraquinone, 1-amino-4-benzylamino-anthraquinone, etc.).

The invention is illustrated by the following specific examples in which the parts are by weight and the temperatures are in degrees centigrade.

Example 1.—84 parts of 1-amino-4'-methoxy-phenylamino)-anthraquinone-2-sodium sulfonate, in the form of 300 parts of a wet press cake containing 20 parts of inorganic salts, are mixed with 3,000 parts of water; 140 parts of furfural are added; and the mixture is heated to from 90° to 95°. To the vigorously agitated mixture, 191 parts of 50 per cent aqueous caustic soda solution are introduced in small portions during a period of about 45 minutes. Then for about 1 hour longer the temperature is maintained between 90° and 95° and agitation is continued. During the reaction, blue insoluble flocks of 1-amino-4-(4'-methoxy-phenylamino)-anthraquinone are precipitated from the solution. When the reaction is complete, the insoluble product is filtered off as the cake, washed with hot water until free of alkali, dried, and reduced to a powder. A good yield of 1-amino-4-(4'-methoxy-phenylamino)-anthraquinone is obtained.

Example 2.—10 parts of a dry powder which consists substantially of about 8.5 parts of 1-amino-4-n-butylamino-anthraquinone-2-sodium sulfonate and about 1.5 parts of inorganic salts are dissolved in 400 parts of hot water. 76 parts of 50 per cent aqueous caustic soda solution and 20 parts of furfural, in the order named, are stirred into the solution thus obtained. The resulting mass is heated to from 90 to 100°, while being agitated continuously, and is maintained at that temperature for about two hours or until a drop of the reaction mass no longer dissolves in hot water to give a blue solution. During the reaction, blue, insoluble crystals of 1-amino-4-n-butylamino-anthraquinone are precipitated from the solution. When the reaction is complete, the hot mass is filtered. The filter cake is washed with hot water until it is free from alkali, and is then dried. A good yield of 1-amino-4-n-butylamino-anthraquinone is thereby obtained.

It will be realized by those skilled in the art that the invention is not limited to the details of the above specific examples but that changes may be made without departing from the scope of the invention.

Thus, other para-diamino-ortho-sulfo-anthraquinones may be subjected to the desulfonation treatment, and the conditions of the treatment, reagents and proportions thereof employed may be varied, as discussed above. Further, alcohol or other water-miscible solvents which are inert under the conditions of the reaction may be included in the reaction mixture in minor proportions to increase the solubility of the reactants, if desired.

The wet filter cake may be employed directly for the preparation of dyestuff compositions (e. g., for dyeing cellulose acetate) or other products, or it may be dried with or without additional agents employed in connection with the use of the 1,4-diamino-anthraquinones.

I claim:

1. In the production of a 1,4-diamino-anthraquinone by the desulfonation of a para-diamino-ortho-sulfo-anthraquinone with an alkaline reducing agent, the improvement which comprises reacting the para-diamino-ortho-sulfo-anthraquinone with a furane aldehyde and aqueous alkali.

2. In the production of a 1,4-diamino-anthraquinone by the desulfonation of a para-diamino-ortho-sulfo-anthraquinone with an alkaline reducing agent, the improvement which comprises heating the para-diamino-ortho-sulfo-anthraquinone with furfural in an aqueous alkaline reaction medium.

3. In the production of a 1,4-diamino-anthraquinone by the desulfonation with an alkaline reducing agent of a para-diamino-ortho-sulfo-anthraquinone containing a single anthraquinone radical, the improvement which comprises heating an aqueous reaction mixture containing the para-diamino-ortho-sulfo-anthraquinone, a furane aldehyde, and an alkali metal hydroxide.

4. In the production of a 1,4-diamino-anthraquinone by the desulfonation with an alkaline reducing agent of a para-diamino-ortho-sulfo-anthraquinone containing a single anthraquinone radical, the improvement which comprises heating an aqueous reaction mixture containing the para-diamino-ortho-sulfo-anthraquinone in the form of an alkali metal salt, furfural, and an alkali metal hydroxide.

5. In the production of a 1,4-diamino-anthraquinone by the desulfonation with an alkaline reducing agent of a para-diamino-ortho-sulfo-anthraquinone containing a single anthraquinone radical, the improvement which comprises mixing the para-diamino-ortho-sulfo-anthraquinone with sufficient water to form a thinly fluid mixture, adding furfural in excess of an equimolecular proportion based on the para-diamino-ortho-sulfo-anthraquinone, and heating the mixture with an alkali metal hydroxide.

6. In the production of a 1,4-diamino-anthraquinone by the desulfonation with an alkaline reducing agent of a para-diamino-ortho-sulfo-anthraquinone containing a single anthraquinone radical, the improvement which comprises mixing the para-diamino-ortho-sulfo-anthraquinone with sufficient water to form a thinly fluid mixture, adding furfural in excess of an equimolecular proportion based on the para-diamino-ortho-sulfo-anthraquinone, and heating the mixture while gradually adding an alkali metal hydroxide thereto.

7. A method of making a 1-amino-4-arylamino-anthraquinone from the corresponding compound selected from the group consisting of 1 - amino - 4 - arylamino -2- sulfo-anthraquinone and 1-amino-4-arylamino - 3 - sulfo-anthraquinone, which comprises reacting the amino-arylamino-sulfo-anthraquinone with furfural and an alkali metal hydroxide in an aqueous reaction medium.

8. A method of making a 1-amino-4-arylamino-anthraquinone from the corresponding compound selected from the group consisting of 1-amino-4-arylamino-2-sulfo-anthraquinone and 1-amino-4-arylamino - 3 - sulfo-anthraquinone, which comprises heating nearly to its boiling point an aqueous reaction mixture containing about one mol of the amino-arylamino-sulfo-anthraquinone, 4.5 to 18 mols of furfural, and 1.5 to 5 mols of sodium hydroxide per mol of furfural.

9. A method of making a 1-amino-4-alkylamino-anthraquinone from the corresponding compound selected from the group consisting of 1-amino-4-alkylamino - 2 - sulfo - anthraquinone and 1-amino-4-alkylamino-3-sulfo - anthraquinone, which comprises reacting the amino-alkylamino-sulfo-anthraquinone with furfural and an alkali metal hydroxide in an aqueous reaction medium.

10. A method of making a 1-amino-4-alkylamino-anthraquinone from the corresponding compound selected from the group consisting of 1-amino-4-alkylamino - 2 - sulfo - anthraquinone and 1-amino-4-alkylamino-3-sulfo - anthraquinone, which comprises heating nearly to its boiling point an aqueous reaction mixture containing about one mol of the amino-alkylamino-sulfo-anthraquinone, 4.5 to 18 mols of furfural, and 1.5 to 5 mols of sodium hydroxide per mol of furfural.

JAMES OGILVIE.